United States Patent
Junius et al.

(10) Patent No.: US 10,378,681 B2
(45) Date of Patent: Aug. 13, 2019

(54) COLD-ROLLED NARROW STRIP IN THE FORM OF FLAT WIRE OR PROFILED ELEMENTS MADE OF A HIGH-STRENGTH STEEL

(71) Applicant: C.D. Waelzholz GmbH, Hagen (DE)

(72) Inventors: Hans-Toni Junius, Schwerte (DE); Heino Buddenberg, Wetter (DE); Norbert Brachthaeuser, Bochum (DE); Dirk Wilmes, Iserlohn (DE)

(73) Assignee: C.D. Waelzholz GmbH, Hagen (DE)

( * ) Notice: Subject to any disclaimer, the term of this patent is extended or adjusted under 35 U.S.C. 154(b) by 751 days.

(21) Appl. No.: 14/905,302

(22) PCT Filed: Jul. 16, 2014

(86) PCT No.: PCT/DE2014/000370
§ 371 (c)(1),
(2) Date: Jan. 15, 2016

(87) PCT Pub. No.: WO2015/007265
PCT Pub. Date: Jan. 22, 2015

(65) Prior Publication Data
US 2016/0178093 A1      Jun. 23, 2016

(30) Foreign Application Priority Data
Jul. 18, 2013   (DE) .................. 10 2013 012 118

(51) Int. Cl.
*F16L 11/00* (2006.01)
*F16L 11/24* (2006.01)
(Continued)

(52) U.S. Cl.
CPC ............ *F16L 11/10* (2013.01); *B21B 1/16* (2013.01); *B21B 1/22* (2013.01); *B21C 1/003* (2013.01);
(Continued)

(58) Field of Classification Search
CPC ......... C22C 38/06; C22C 38/46; C22C 38/12; C22C 38/04; C22C 38/48; C22C 38/02;
(Continued)

(56) References Cited

U.S. PATENT DOCUMENTS

| 2004/0050442 A1 | 3/2004 | Glejbol et al. |
| 2008/0006350 A1 | 1/2008 | Junius et al. |
| 2013/0209831 A1 | 8/2013 | Becker et al. |

FOREIGN PATENT DOCUMENTS

| EP | 2383353 A2 * | 11/2011 | ............ C21D 8/02 |
| EP | 2 402 472 A1 | 1/2012 | |

(Continued)

OTHER PUBLICATIONS

International Search Report of PCT/DE2014/000370, dated Mar. 27, 2015.

*Primary Examiner* — Michael E. La Villa
(74) *Attorney, Agent, or Firm* — Collard & Roe, P.C.

(57) ABSTRACT

A flat wire or a narrow strip has a profiled cross-section and is composed of a high-strength steel having the following composition (in weight-%): C 0.2-0.9%, Mn 12-25%, Si up to 0.5%, Al 0.5-2.0%, Cr 1.8-3.5%, S max. 0.005%, P max. 0.06%, N max. 0.1%, Mo max. 1.5%, B max. 0.01%, Ni max. 2.0%, Cu max. 2.0%, Ca max. 0.015%, Nb 0.02-0.35% and/or V 0.02-0.35%, and, as the remainder, iron and unavoidable, production-related contaminants. The wire or strip is cold-rolled and/or cold-profiled from wire-form precursor material, and has improved $R_{p0.2}$, $R_m$, and A80 mechanical values.

26 Claims, 1 Drawing Sheet

(51) Int. Cl.
| | |
|---|---|
| C21D 8/02 | (2006.01) |
| C21D 8/06 | (2006.01) |
| C21D 6/00 | (2006.01) |
| C21D 1/30 | (2006.01) |
| C21D 9/52 | (2006.01) |
| C22C 38/58 | (2006.01) |
| C22C 38/48 | (2006.01) |
| C22C 38/46 | (2006.01) |
| C22C 38/06 | (2006.01) |
| C22C 38/02 | (2006.01) |
| C22C 38/00 | (2006.01) |
| B22D 7/00 | (2006.01) |
| B21B 1/22 | (2006.01) |
| B21B 1/16 | (2006.01) |
| F16L 11/10 | (2006.01) |
| C22C 38/22 | (2006.01) |
| C22C 38/20 | (2006.01) |
| C22C 38/18 | (2006.01) |
| C22C 38/28 | (2006.01) |
| C22C 38/24 | (2006.01) |
| C22C 38/26 | (2006.01) |
| C22C 38/32 | (2006.01) |
| C22C 38/40 | (2006.01) |
| B21C 1/00 | (2006.01) |
| C21D 9/08 | (2006.01) |
| C21D 9/14 | (2006.01) |
| C21D 1/25 | (2006.01) |
| C21D 1/22 | (2006.01) |
| C22C 38/04 | (2006.01) |
| C22C 38/08 | (2006.01) |
| C22C 38/12 | (2006.01) |
| F16L 11/08 | (2006.01) |

(52) U.S. Cl.
CPC ............... *B22D 7/00* (2013.01); *C21D 1/25* (2013.01); *C21D 1/30* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0273* (2013.01); *C21D 8/065* (2013.01); *C21D 9/08* (2013.01); *C21D 9/14* (2013.01); *C21D 9/52* (2013.01); *C21D 9/525* (2013.01); *C22C 38/001* (2013.01); *C22C 38/002* (2013.01); *C22C 38/02* (2013.01); *C22C 38/06* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/40* (2013.01); *C22C 38/46* (2013.01); *C22C 38/48* (2013.01); *C22C 38/58* (2013.01); *F16L 11/24* (2013.01); *B21B 2001/221* (2013.01); *B21B 2001/225* (2013.01); *C21D 1/22* (2013.01); *C21D 2211/001* (2013.01); *C22C 38/04* (2013.01); *C22C 38/08* (2013.01); *C22C 38/12* (2013.01); *F16L 11/083* (2013.01); *Y10T 428/12951* (2015.01); *Y10T 428/12972* (2015.01); *Y10T 428/12979* (2015.01)

(58) Field of Classification Search
CPC ..... C22C 38/002; C22C 38/001; C22C 38/58; C22C 38/08; C22C 38/18; C22C 38/20; C22C 38/22; C22C 38/24; C22C 38/26; C22C 38/28; C22C 38/32; C22C 38/40; F16L 11/083; F16L 11/24; F16L 11/10; B21C 1/003; C21D 1/25; C21D 8/065; C21D 9/08; C21D 9/14; C21D 1/30; C21D 2211/001; C21D 1/22; C21D 9/525; C21D 9/52; C21D 8/0273; C21D 8/0263; C21D 8/0236; C21D 8/0226; C21D 8/0205; C21D 6/008; C21D 6/005; C21D 6/004; B22D 7/00; B21B 2001/225; B21B 2001/221; B21B 1/22; B21B 1/16; Y10T 428/12951; Y10T 428/12972; Y10T 428/12979
See application file for complete search history.

(56) References Cited

FOREIGN PATENT DOCUMENTS

| WO | 2006/050680 | A1 | | 5/2006 |
| WO | 2011/120525 | A1 | | 10/2011 |
| WO | WO 2012/001163 | | * | 1/2012 |
| WO | 2012/171530 | A1 | | 12/2012 |

* cited by examiner

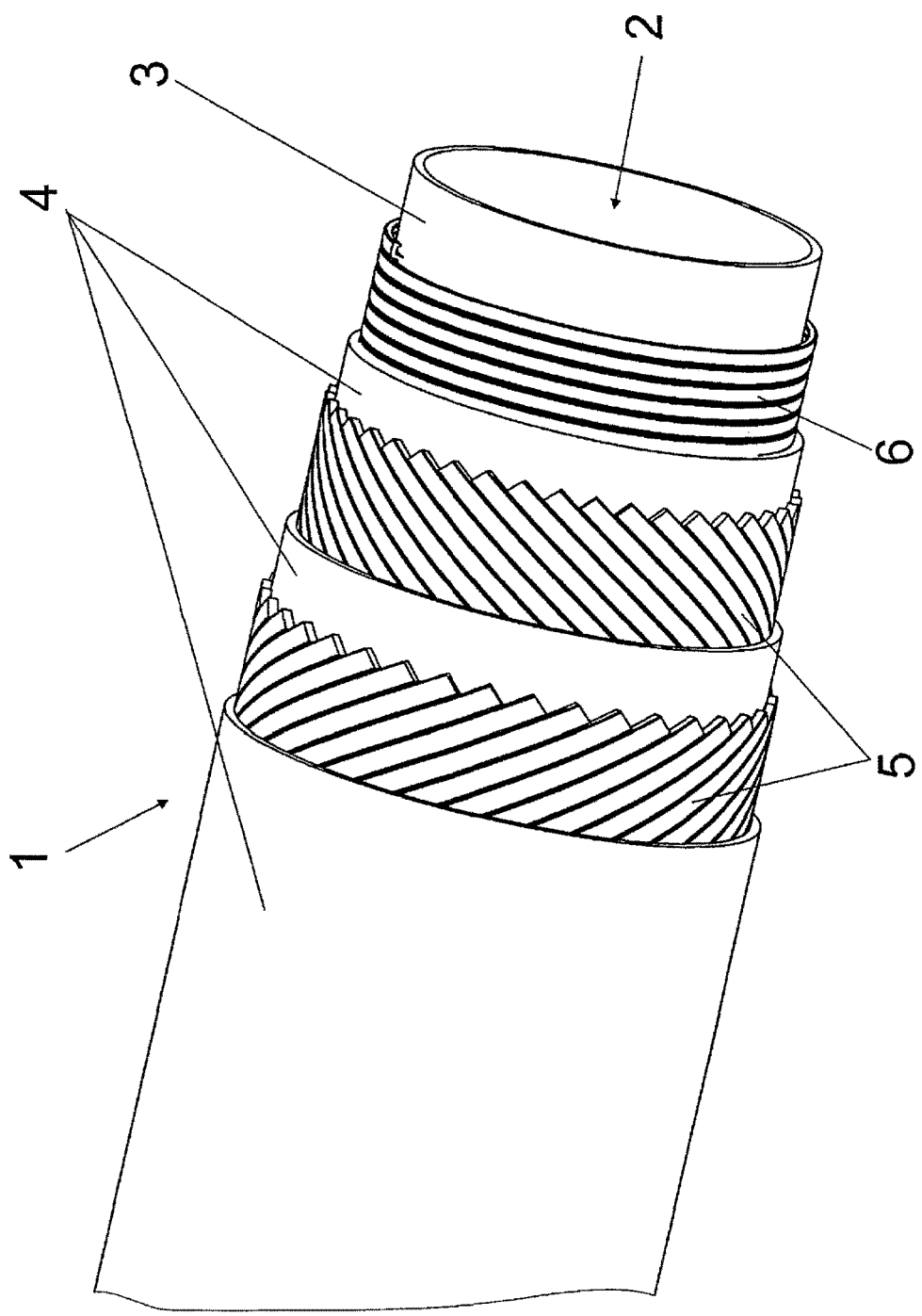

COLD-ROLLED NARROW STRIP IN THE FORM OF FLAT WIRE OR PROFILED ELEMENTS MADE OF A HIGH-STRENGTH STEEL

CROSS REFERENCE TO RELATED APPLICATIONS

This application is the National Stage of PCT/DE2014/000370 filed on Jul. 16, 2014, which claims priority under 35 U.S.C. § 119 of German Application No. 10 2013 012 118.3 filed on Jul. 18, 2013, the disclosures of which are incorporated by reference. The international application under PCT article 21(2) was not published in English.

BACKGROUND OF THE INVENTION

1. Field of the Invention

The invention relates to a cold-rolled narrow strip in the form of flat wire or profiles composed of a high-strength steel, for use in flexible pipes, particularly in flexible pipes for offshore applications, as well as to a method for the production of such cold-rolled narrow strips.

2. Description of the Related Art

Flexible pipes are used in many areas of technology, for the most varied purposes, and predominantly have the task of conducting fluid media such as water, oil, gas or the like, and shielding them with regard to the environment. In this connection, such flexible pipes are subject to the most varied influences, for one thing influences resulting from mechanical stress on the basis of the area of use and the use environment, and for another thing influences on the basis of the physical properties and chemical composition of the fluids to be conducted.

An important and technically very demanding area of use for such flexible pipes resides in what is called offshore applications, in which the flexible pipes are used for applications in the ocean. In this connection, the flexible pipes are used for conducting water and/or aggressive fluids such as oil or gases, which are supposed to be brought from the ocean floor to the ocean surface, for example, wherein the flexible pipes, if necessary, can be designed in such a manner so that they can be used at water depths of at least 2500 m. Transport of such liquids or gases takes place, in this connection, over great distances, so that the flexible pipes also have corresponding lengths, and accordingly are subject to great stresses both on the basis of their inherent weight and on the basis of the forces that act on them from the environment.

Such flexible pipes for offshore applications have been known for a long time and are produced according to different standards. Such flexible pipes usually have an inner tubular and flexible core that accommodates the medium to be transported, which core conducts the medium to be transported and seals it off from the environment. This flexible core is usually produced from polymer materials. The flexible core is surrounded by one or more armoring layers, usually composed of steel materials, wherein the steel materials are applied to the flexible core in the form of wound steel wires or steel strips, because of the required flexibility. In this connection, the flexible core and the one or more armoring layers are not attached to one another, relative to one another, but rather can shift relative to one another to a slight degree, thereby improving the flexibility and bendability of the flexible pipes. In this connection, the armoring layers surround the flexible core and protect it, on the one hand, from stresses arising out of the environment, and reinforce the flexible pipe with regard to stresses during transport, during laying, and during operation of such flexible pipes. Additional plies of polymer materials can be disposed between the plies of the armoring layers and/or the flexible core. Also, in some designs of such flexible pipes, a casing-like reinforcement of the flexible core is undertaken, by means of which the great pressure stress on the inner core caused by the great ambient pressure in deep-water use is supposed to be absorbed. The armoring layers are produced from steel wires or steel strips, which are wound around the flexible core in helical shape during production of the flexible pipe. Also, armoring layers that perform different tasks on such a flexible pipe can be provided, for example as a pure reinforcement ply composed of flat strips that lie next to one another, or as what is called a shape-fit profile, in which the steel strips wound next to one another are profiled and anchor themselves mechanically by way of shape fit, and thereby form a more stable composite than the simple reinforcement strips. For this purpose, the strips to be processed must be profiled accordingly in advance. When armoring strips are mentioned hereinafter, in simplified form, this can always refer to the different known configurations of metallic reinforcement elements on such flexible pipes, independent of their arrangement in the individual layers of the flexible pipe and their structure based on one or more strands of an armoring ply that are wound in parallel, in helical shape.

Other material can also be used for reinforcement, in combination with metallic wires. Composite layers or strips can be used for the pipe structure in place of one or more metallic layers, in order to reduce the weight of the flexible pipe.

The flexible pipes are usually produced from individual pieces, because they frequently require greater lengths than can be produced from a precursor material, in terms of production technology. For this reason, it must be possible to weld the armoring layers of the respective partial pieces permanently to one another, so as to withstand great stress, so that the steels used for the armoring layers must demonstrate good weldability.

Such flexible pipes are subject to great static or dynamic stresses during use. Dynamically stressed pipes require the use of high-strength steels. The welding locations required at the ends of the steel wires or steel strips must also be able to withstand great stresses.

Corrosion damage can occur as the result of the contact with liquid or gaseous media that contain $H_2S$ and/or $CO_2$, as well as due to condensate formation between the steel plies. Also, great stress caused by components of the acidic media, which lead to great corrosion stress on the armoring layers, as the result of unavoidable diffusion processes from the liquid or gaseous media through the material of the pipe-like and flexible core, at least in the inner armoring plies. For this reason, the steels used must demonstrate good resistance to stress crack corrosion and to hydrogen brittleness when used in contact with acidic media. In general, steels having a tensile strength of more than 1000 MPa are considered to have no or little resistance to stress crack corrosion and hydrogen brittleness, and are therefore eliminated for this application.

Austenite steels that contain manganese or high amounts of manganese, called TWIP steels (TWIP—twinning induced plasticity), were developed in recent years as hot-rolled and cold-rolled strips, by way of the flat production route (steel plant—slab (rectangular format) from continuous casting or cast block—hot strip or thin strip—cold strip), and particularly for structural components in automobile construction. The advantageous properties of such TWIP steels as compared with other high-strength steels are great initial strength in hot strip, great hardening during cold forming, and extremely good plasticity. Some alloy concepts furthermore offer good weldability and greatly improved resistance against hydrogen-induced crack formation.

A higher-strength cold-formable steel and corresponding flat steel products are known from EP 2 402 472 A1, which particularly demonstrate good welding suitability and TWIP behavior, since this steel has a high manganese content. These steels are described exclusively for use in car body construction, in the form of sheets or strips, which furthermore must be subjected to an additional coating treatment with regard to corrosion protection. The production of these steels takes place, in this connection, in conventional manner and in coordination with the dimensions of the sheets or strips required later, by means of conventional rolling methods for broad strip dimensions.

Use of steels having a high manganese content, for use for flexible pipes for offshore applications, is described in WO 2012/171530 A1, in which such steels are described for the production of armoring plies wound from narrow strips. The basic idea of the steels described there for armoring plies in flexible pipes consists in avoiding the expensive components copper and nickel that are usually used for flexible pipes, to the greatest possible extent, or to reduce their proportion, in order to reduce the high costs for such alloy components. In this way, it is true that the costs for the steel alloy used are reduced, but at the same time, the steel properties are also negatively influenced. Furthermore, a clearly great silicon content of the alloy is required, which content is required to improve the corrosion resistance and to improve the processability of the steel.

SUMMARY OF THE INVENTION

It is therefore the task of specific embodiments of the present invention to propose flat wire or narrow strip having a profiled cross-section, composed of a new, high-strength steel, with which all the demands on dynamically stressed flexible pipes for use even in an acidic milieu can be met, at clearly greater yield strengths and tensile strengths and increased plasticity as compared with high-strength steels that are usual nowadays.

The solution for the task is evident from the characterizing features of specific embodiments according to the invention. Further advantageous embodiments of the invention are discussed below.

The invention relates to a flat wire or a narrow strip having a profiled cross-section, composed of a high-strength steel having the following composition (in weight-%):
C 0.2-0.9%, preferably 0.3-0.6%,
Mn 12-25%, preferably 16-23%,
Si up to 0.5%, preferably 0.2-0.5%,
Al 0.5-2.0%, preferably 0.80-1.5%,
Cr 1.8-3.5%, preferably 2.0 to 2.7%,
S max. 0.005%, preferably max. 0.003%,
P max. 0.06%, preferably max. 0.035%,
N max. 0.1%,
Mo max. 1.5%,
B max. 0.01%,
Ni max. 2.0%,
Cu max. 2.0%,
Ca max. 0.015%,
Nb 0.02-0.35% and/or V 0.02-0.35%, preferably 0.05-0.20%, in
each instance,
as well as optionally
Ti 0.01-0.35%,
and, as the remainder, iron and unavoidable, production-related contaminants, cold-rolled and/or cold-profiled from wire-form precursor material, with optional intermediate annealing and/or final annealing treatment, to achieve the following mechanical values:
$R_{p0.2}$ 500-1650 MPa,
$R_m$ 750-1800 MPa,
A80 3-50%,
for the production of armoring plies in flexible pipes for conveying petroleum and natural gas, as well as for transport of floating liquefied natural gas (FLNG) under acid gas conditions (acidic attack media).

Such flat wires or narrow strips having a profiled cross-section, composed of a high-strength steel having the composition according to the invention, are particularly suitable for the production of armoring plies in flexible pipes for conveying petroleum and natural gas, as well as for transport of floating liquefied natural gas (FLNG) under acid gas conditions (acidic attack media), because they demonstrate not only great initial strength in the hot strip but also great hardening during cold-forming, and extremely good plasticity, and thereby meet the mechanical demands on such flat wires or narrow strips for the relevant areas of use to a particularly great degree. It has furthermore been shown that the high-strength steel according to the invention furthermore demonstrates good weldability when using known welding technologies and greatly improved resistance to hydrogen-induced crack formation. This greatly improved resistance to hydrogen-induced crack formation can be particularly attributed to alloying in the element chromium in the scope of 2-3.5 weight %, because the chromium forms finely distributed chromium carbides and chromium nitrides with the elements carbon and nitrogen, which serve as hydrogen scavengers when hydrogen is introduced, and prevent hydrogen-induced crack formation by way of this mechanism. Thus, the steel according to the invention is particularly suitable for use under acid gas conditions, as they frequently occur when using flexible pipes. Furthermore, the finely distributed precipitates have a grain-fining effect, which in turn reduces the crack sensitivity and improves formability. By means of alloying in the chromium, the steel according to the invention furthermore is clearly distinguished from the steel according to WO 2012/171530 A1, which explicitly requires that the chromium content be low, and merely views this as an unavoidable accompanying element, but limits it to at most a value of 0.15 weight-%. A further difference lies in the low silicon content of the steel according to the invention, which is allowed to lie in the range of only up to 0.5 weight-%. The significantly higher proportions of silicon in WO 2012/171530 A1 are explicitly required there for processability of the steel, and can be limited to a low value in the steel according to the invention here. Furthermore, mechanical properties that lie above the previously known properties of high-strength steels for the applications according to the invention can be achieved by the method of processing of the steel according to the invention, by way of the wire-form precursor materials, as well as cold-rolling/cold-profiling. At the values of the high-strength steel for $R_{p0.2}$ between 1000 and 1500 MPa, for $R_m$ between 1100-1700 MPa, and for A80 between 6-25%, these values are such that the required stress resistance of flexible pipes produced from it is already achieved at low material cross-sections, or, vice versa, pipes that can withstand greater stress can be produced at the same dimensions of the flexible pipes. Therefore the flat wires or narrow strips having a profiled cross-section, composed of a high-strength steel, are particularly suitable for the production of armoring plies in flexible pipes for conveying petroleum and natural gas, as well as for transport of floating, liquefied natural gas (FLNG) under acid gas conditions (acidic attack media), if these flexible pipes have particularly great lengths or are subject to particularly great, particularly dynamic stresses. In this way, the useful lifetime of the flexible pipes, which are generally in use for 20 years, can be clearly extended and the failure safety can be increased, as was already the case as the result of the improvement in susceptibility to corrosion.

It is particularly advantageous if the high-strength steel for the flat wire or the narrow strip has an austenite structure, particularly also having TWIP properties. Such structures have a great initial strength in the hot strip, great hardening during cold forming, and extremely good plasticity during forming, and furthermore offer good weldability and greatly improved resistance to hydrogen-induced crack formation.

In a first embodiment, the high-strength steel can be used for a narrow strip having round or flat edges, or edges rolled in defined manner, as a reinforcement strip for the production of wound armoring plies. Such reinforcement strips are generally used for the outer layers of the flexible pipe, and, in order to guarantee good flexibility, must have corresponding mobility values of the armoring plies wound from them, which mobility is also co-determined by the edge configuration of the narrow strips. This edge configuration can be produced in particularly simple manner in the case of the steel according to the invention, and can be guaranteed to have a stable shape.

In another embodiment, the high-strength steel can be used for a narrow strip having a profiled cross-section, as a shape-fit profile, particularly a Z profile, as an armoring strip for the production of wound armoring plies. Such armoring plies composed of the narrow strips according to the invention are generally disposed directly above the flexible, hose-like conductor, and particularly also must fulfill strength properties with regard to the compression of the flexible, hose-like conductor. The latter is subject to stress not only from the mechanical influence due to tensile forces, but also by the ambient pressure that prevails at greater ocean depths, and the Z profiles connected with shape fit in this manner (here, other cross-section shapes are also used, such as, for example, T profiles, C profiles, K profiles, X profiles or the like) are supposed to withstand the outside pressure, so that the hose-like conductor is not impermissibly compressed. For this reason, it is also conceivable, in a further embodiment, that the high-strength steel is used for a narrow strip as a casing in a hose-like flexible core of a flexible pipe. Furthermore, in another embodiment, such a narrow strip can be used as a holder for another longitudinally extended element, which holder is correspondingly shaped in terms of its cross-section, wherein such longitudinally extended elements can have metallic or multi-component or polymer materials, for example, to improve strength and buoyancy.

The invention furthermore relates to a method for the production of flat wire or narrow strip having a profiled cross-section, composed of a high-strength steel, in which the high-strength steel is cast to form billets or blocks, the billets or blocks are rolled to wire diameters between 5-30 mm, by means of hot rolling, and subsequently drawn to a defined intermediate diameter on a drawing system, in one or more passes, in the cold state, as wire, and afterward this steel wire is cold-rolled to the final dimensions and the final shape in one or more passes. It is characteristic for this production method that the entire production path extends over the wire rail, in other words strips from sheet-type or wide strip precursor products are not used, but rather directly after casting of the steel in the form of billets or blocks, this steel is hot-rolled to wire-shaped cross-sections, and, proceeding from these, is formed ever closer to the final dimensions by means of a sequence of drawing work and cold-rolling work that takes place in the cold state, in each instance. In this connection, depending on the sequence of the processing steps and the required strength values, intermediate and final annealing can take place between the respective cold processing, by means of which annealing the required mechanical properties can be influenced and improved in targeted manner. In particular, the combination of drawing work and cold-rolling work that takes place in the cold state, in each instance, as well as the annealing treatments, permit extensive influencing of the microstructure and of the structure orientation, which is difficult to produce by means of cold rolling alone.

In this way, particularly suitable steel alloy cold-rolled flat wires and cold-rolled profiles can be produced directly from wire, for use, according to the invention, for flexible pipes for conveying petroleum and natural gas. Thus, for example, a steel alloy according to the invention, melted in an electric steel mill can be subsequently treated using secondary metallurgy; it is subsequently degassed in a vacuum system and cast into billets by means of extrusion or into blocks. These directly cast or reblocked square billets are then heated to temperatures of approximately 1150° C. in a warming furnace, and rolled to wire diameters between 5-30 mm in a wire-rolling lane, and cooled. Subsequently, the rolled wire bundle, which weighs 1 to 3 metric tons, can then be pickled in mixed acids to remove scale, or can be mechanically de-scaled. The scale-free rolled wire is subsequently drawn to a defined intermediate diameter in a drawing system, in one or more passes, in the cold state. The ovality of the wire is eliminated by means of drawing of the steel wire, and pre-hardening is produced. The defined drawing diameter is selected to match the final cross-section and the expected widening during cold rolling.

Subsequently, in a first advantageous embodiment, the cold-drawn steel wire can be brought to an intermediate dimension by means of flat rolling of the wire, to a rectangular final dimension having round edges or edges rolled in defined manner, by means of at least one annealing treatment and at least one cold-rolling. This is the path of production of wires/narrow strips as a reinforcement strip in armoring plies of corresponding flexible pipes.

In another embodiment, the cold-drawn steel wire can be rolled to a defined intermediate profile by means of cold rolling, in one or more passes, subsequently annealed at least once, and brought to the profiled final shape, particularly a Z-shaped final shape or a final shape profiled in some other manner, particularly a profile shape of a shape-fit profile, by means of at least one cold rolling. These shape-fit profiles have particularly great longitudinal and transverse mechanical stability, because of the shape-fit fixation of wires/narrow strips disposed adjacent to one another that occurs during production of the flexible pipe, and do not impair the flexibility of the flexible pipe beyond normal limits. In this connection, not only the strength of the individual wire/narrow strip but also a highly precise cross-sectional formation is important, so that the strips that are crossed with one another can be firmly attached to one another. In another embodiment, for example for simple profile end cross-sections, the final profile can also be rolled directly, without rolling to an intermediate profile.

In a further embodiment, after cold-rolling to a profiled final shape, an annealing treatment is optionally carried out, particularly stress-free annealing or stress-relief annealing of the wire/narrow strip that is produced. In this way, the mechanical properties of the wire/narrow strip that is produced can be further influenced after the final shaping; in particular, the annealing treatment can serve as a final treatment for establishing the mechanical values and/or for reducing inherent stresses.

In a first embodiment, the annealing treatment can be carried out between the drawing and/or rolling treatments, as hood annealing in a coil, under inert gas, preferably under an $H_2$ atmosphere. In this connection, the entire coil is annealed at the same time, and this has advantages in terms of energy technology.

Alternatively, however, it is also conceivable that the annealing treatment is carried out between the drawing and/or rolling treatments, in a pass-through method, with conductive or also with inductive heating. In this connection, only short segments of the wire/narrow strip are locally heated at a time, as they pass through corresponding heating devices, thereby making it possible to achieve more targeted temperature management and a more targeted influence on the structure changes brought about by annealing, but at the same time, a reduction in the pass-through time of the wire/narrow strip also takes place.

The temperature profile that is achieved can contain more rapid heating and accelerated or controlled cooling of the wire during every heat treatment, in order to produce an optimal texture and properties in the steel.

Furthermore, it is conceivable that the melt is treated with a metallurgical calcium treatment in the steel mill, with at least 0.0015% Ca, to influence the inclusion size and inclusion shape of the non-metallic inclusions. This treatment leads to finely distributed and molded Ca inclusions, which, in contrast to coarse and line-shaped inclusions, are non-sensitive to acidic media (hydrogen-induced tension crack corrosion).

The invention furthermore describes use of the flat wire or narrow strip having a profiled cross-section for a flexible pipe for conveying petroleum and natural gas, as well as for transport of floating liquefied natural gas (FLNG) under acid gas conditions (acidic attack media), having an inner, hose-like fluid conductor, as well as at least one ply of armoring strips disposed in the fluid conductor in helical manner or wound onto or over the fluid conductor, composed of the high-strength steel for flat wire or narrow strip having a profiled cross-section.

BRIEF DESCRIPTION OF THE DRAWINGS

A particularly preferred embodiment of a flexible pipe, using the wires/narrow strips according to the invention, is shown in the drawing.

This shows:

FIG. 1—a layer-type structure of a flexible pipe, using the wires/narrow strips according to the invention, for use in conveying petroleum and natural gas, as well as for transport of liquefied natural gas (FLNG) under acid gas conditions (acidic attack media).

DETAILED DESCRIPTION OF THE PREFERRED EMBODIMENTS

A flexible pipe 1, which has been produced using the steel according to the invention or the steel strips/wires according to the invention, consists of an inner hose-shaped inner pipe 3, which has an elongated opening 2 for conducting fluids such as liquids or gases. The hose-shaped inner pipe 3 usually consists of a polymer material and seals off the elongated opening 2 and thereby the fluid to be conducted, relative to the environment.

The hose-shaped inner pipe 3 is surrounded by multiple plies of polymers as well as at least two plies of reinforcement strip 5, and, optionally, one (or also multiple plies) of a shape-fit profile 6. In this connection, the shape-fit profile 6 can, as shown here, be wound directly onto the inner pipe 3, in helical shape, at a slight slant angle. In this connection, the shape-fit profile 6 has such a cross-section that because of the helical winding process, windings of the same or of one or more further shape-fit profiles 6 that come to lie adjacent to one another can hook into one another with shape fit, along their edges, and thereby form a significantly more stable composite than if the shape-fit profiles 6 are simply wound to lie next to one another. In this way, the wound shape-fit profiles 6 can clearly contribute to the strength properties of the flexible pipe 1.

Here, two plies of reinforcement strip 5 are disposed above the ply of the shape-fit profile 6, separate from the optional ply of the shape-fit profile 6 and further plies 4 composed of polymer material, in each instance, wherein the reinforcement strip 5 that forms this ply (or also multiple reinforcement strips 5 wound to lie next to one another) can touch at the edges, but is/are not disposed to be connected with one another. Also, the reinforcement strip 5 that forms this ply is wound on at a clearly greater slant angle.

In the following, two exemplary compositions of the flat wire or narrow strip according to the invention, as well as values for mechanical characteristic values determined for them, are indicated:

TABLE 1

Chemical analysis of two sample alloys

| Alloy | C | Si | Mn | P | S | Al | Cr | N | Ni | V | Nb |
|---|---|---|---|---|---|---|---|---|---|---|---|
| 1 | 0.42 | 0.38 | 18.8 | 0.019 | 0.001 | 1.3 | 2.4 | 0.0070 | 0.68 | 0.12 | 0.01 |
| 2 | 0.35 | 0.36 | 17.5 | 0.016 | 0.001 | 1.2 | 2.5 | 0.0065 | 0.53 | 0.02 | 0.11 |

TABLE 2

Mechanical values of the alloys in the production state

| Alloy | Rp 0.2 (MPa) | Rm (MPa) | Rp/Rm | Elongation to rupture A80 (%) |
|---|---|---|---|---|
| 1 | 1146 | 1267 | 0.904 | 16 |
| 1 | 1037 | 1238 | 0.838 | 18 |
| 1 | 992 | 1218 | 0.814 | 20 |
| 2 | 1103 | 1217 | 0.906 | 18 |
| 2 | 1012 | 1193 | 0.848 | 19 |
| 2 | 941 | 1176 | 0.800 | 21 |
| 1 | 1232 | 1430 | 0.862 | 13 |
| 1 | 1362 | 1567 | 0.869 | 9 |
| 1 | 1429 | 1664 | 0.859 | 8 |
| 1 | 1481 | 1718 | 0.862 | 6 |

REFERENCE NUMBER LIST

1—flexible pipe
2—elongated opening
3—hose-shaped inner pipe
4—plies of polymers
5—reinforcement strip
6—shape-fit profile

The invention claimed is:

1. Flat wire or narrow strip having a profiled cross-section, composed of a high-strength steel having the following composition (in weight percent):
C 0.2-0.9%,
Mn 12-25%,
Si 0.2-0.5%,
Al 0.5-2.0%,
Cr 1.8-3.5%,
S max. 0.005%,
P max. 0.06%,
N max. 0.1%,
Mo max. 1.5%,
B max. 0.01%,
Ni max. 2.0%,
Cu max. 2.0%,
Ca max. 0.015%,
Nb 0.02-0.35% and/or V 0.02-0.35%, in each instance,
and, as the remainder, iron and unavoidable, production-related contaminants, cold-rolled and/or cold-profiled from wire-form precursor material, with optionally at least one intermediate annealing and/or an optional final annealing treatment, to achieve the following mechanical values:
$R_{p0.2}$ 1000-1500 MPa,
$R_m$ 1100-1800 MPa,
A80 5-25%,
for the production of armoring plies in flexible pipes for conveying petroleum and natural gas, as well as for transport of liquefied natural gas (FLNG) under acid gas conditions.

2. Flat wire or narrow strip according to claim 1, wherein the steel is treated with a calcium treatment having a Ca content of at least 0.0015 weight percent.

3. Flat wire or narrow strip according to claim 1, wherein the high-strength steel for the flat wire or the narrow strip has an austenite structure.

4. Flat wire or narrow strip according to claim 1, wherein the high-strength steel for the flat wire or the narrow strip has TWIP properties.

5. Flat wire or narrow strip according to claim 1, wherein the high-strength steel is used for a narrow strip having round edges or edges rolled in defined manner, as a reinforcement strip for the production of wound armoring plies.

6. Flat wire or narrow strip according to claim 1, wherein the high-strength steel is used for a narrow strip having a profiled cross-section, as an armoring strip, for the production of wound armoring plies.

7. Flat wire or narrow strip according to claim 1, wherein the high-strength steel is used for a narrow strip as a casing in a hose-like flexible core of a flexible pipe.

8. Flat wire or narrow strip according to claim 1, wherein the narrow strip is used as a holder, correspondingly shaped in terms of its cross-section, for another elongated element.

9. Flat wire or narrow strip according to claim 1, wherein the steel further comprises 0.01-0.35% weight percent Ti.

10. Method for the production of the flat wire or narrow strip having a profiled cross-section, composed of high-strength steel according to claim 1, wherein the high-strength steel is cast to form billets or blocks, the billets or blocks are rolled to wire diameters between 5-30 mm, via hot rolling, and subsequently drawn to a defined intermediate diameter, as wire, in a drawing system, in one or more passes, in the cold state, and afterward, this steel wire is cold-rolled to the final dimensions and the final shape, in one or more passes.

11. Method according to claim 10, wherein a steel alloy melted in an electric steel mill is subsequently treated by secondary metallurgy, degassed in a vacuum system, and cast to form billets, using extrusion, or to form blocks.

12. Method according to claim 11, wherein the directly cast or billets, are heated to temperatures of approximately 1150° C. in a heating furnace, and rolled to wire diameters between 5-30 mm in a wire-rolling lane, and subsequently cooled.

13. Method according to claim 12, wherein the hot-rolled steel wire is pickled to remove scale, and subsequently drawn to a defined intermediate diameter on a drawing system, in one or more passes.

14. Method according to claim 13, wherein the cold-drawn steel wire is brought to a rectangular final dimension having round or flat edges, or edges rolled in defined manner, via flat-rolling of the wire to an intermediate dimension.

15. Method according to claim 14, wherein the cold-drawn steel wire is rolled to a defined intermediate profile via cold rolling, in one or more passes, subsequently annealed at least once, and brought to the profiled final shape via at least one cold rolling.

16. Method according to claim 15, wherein after cold rolling to the profiled final shape, an annealing treatment is carried out in the temperature range between 400-700° C.

17. Method according to claim 16, wherein the annealing treatment serves as a final treatment for establishing the mechanical values and/or for reducing inherent stresses.

18. Method according to claim 15, wherein the annealing treatment is carried out between the drawing and/or rolling treatments, as hood annealing in the coil, under inert gas.

19. Method according to claim 17, wherein the annealing treatment is carried out between the drawing and/or rolling treatments, in a pass-through method, with conductive heating.

20. Method according to claim 18, wherein the steel melt is treated with a calcium treatment, with a Ca content of at least 0.0015 weight %.

21. Method according to claim 10, wherein the annealing treatment is carried out between the drawing and/or rolling treatments, in a pass-through method, with inductive heating.

22. A pipe comprising the flat wire or narrow strip according to claim 1, for a flexible pipe for conveying petroleum and natural gas, as well as for transport of liquefied natural gas (FLNG) under acid gas conditions, the pipe having an inner, hose-like fluid conductor as well as at least one ply of armoring strips disposed in the fluid conductor in helical form or wound onto or over the fluid conductor, composed of the high-strength steel for flat wire or narrow strip having a profiled cross-section.

23. Flat wire or narrow strip having a profiled cross-section, composed of a high-strength steel having the following composition (in weight percent):
C 0.2-0.9%,
Mn 12-25%,
Si 0.2-0.5%,
Al 0.5-2.0%,
Cr 1.8-3.5%, S max. 0.005%,
P max. 0.06%,
N max. 0.1%,
Mo max. 1.5%,
B max. 0.01%,
Ni max. 2.0%,
Cu max. 2.0%,
Ca max. 0.015%,
Nb 0.02-0.35% and/or V 0.02-0.35%, in each instance,
and, as the remainder, iron and unavoidable, production-related contaminants, cold-rolled and/or cold-profiled from wire-form precursor material, with optionally at least one intermediate annealing and/or an optional final annealing treatment, to achieve the following mechanical values:

$R_{p0.2}$ 500-1650 MPa,
$R_m$ 1100-1700 MPa,
A80 3-50%,
for the production of armoring plies in flexible pipes for conveying petroleum and natural gas, as well as for transport of liquefied natural gas (FLNG) under acid gas conditions.

24. Flat wire or narrow strip according to claim 23, wherein the steel further comprises 0.01-0.35% weight percent Ti.

25. Flat wire or narrow strip having a profiled cross-section, composed of a high-strength steel having the following composition (in weight percent):
C 0.2-0.9%,
Mn 12-25%,
Si 0.2-0.5%,
Al 0.5-2.0%,
Cr 1.8-3.5%,
S max. 0.005%,
P max. 0.06%,
N max. 0.1%,
Mo max. 1.5%,
B max. 0.01%,
Ni max. 2.0%,
Cu max. 2.0%,
Ca max. 0.015%,
Nb 0.02-0.35% and/or V 0.02-0.35%, in each instance,
and, as the remainder, iron and unavoidable, production-related contaminants, cold-rolled and/or cold-profiled from wire-form precursor material, with optionally at least one intermediate annealing and/or an optional final annealing treatment, to achieve the following mechanical values:

$R_{p0.2}$ 500-1650 MPa,
$R_m$ 750-1800 MPa,
A80 6-25%,
for the production of armoring plies in flexible pipes for conveying petroleum and natural gas, as well as for transport of liquefied natural gas (FLNG) under acid gas conditions.

26. Flat wire or narrow strip according to claim 25, wherein the steel further comprises 0.01-0.35% weight percent Ti.

* * * * *